Patented Mar. 4, 1947

2,416,904

UNITED STATES PATENT OFFICE 2,416,904

METHOD OF HYDROGENATING COUMARONE-INDENE RESIN

William H. Carmody, deceased, late of Springfield, Ohio, by Marie O. Carmody, administratrix, Springfield, Ohio, assignor to Carmody Research Laboratories, Inc., Springfield, Ohio, a corporation of Ohio No Drawing. Application December 3, 1943, Serial No. 512,786

6 Claims. (Cl. 260—81)

This invention relates to the selective hydrogenation of indene and coumarone polymers. The application herein is a continuation-in-part of application of William H. Carmody, Serial No. 280,128, filed June 20, 1939.

In the production of coumarone-indene resins by the polymerization of the resin-forming unsaturates coumarone and indene which occur in the crude solvent naphtha from coke oven light oil, in the coal-derived drip oils, and in the recycle oils from cyclization processes, the resultant polymers, representing all the different orders of polymerization, possess unsaturation of two sorts. One sort of unsaturation is in the benzene rings of the monomeric units which are linked to form the polymer, and the other sort of unsaturation occurs solely in the terminal unit of each of the polymers. In indene polymers unsaturation of the latter sort is in the cyclopentadiene structure of the final monomeric unit of the polymer. It is the premise, supported by experience, that the yellowing of coumarone and indene substances occurs by reaction at the terminal double bond or point of unsaturation of each of the polymers. This phenomenon of "yellowing" is a seriously disadvantageous property of the resins composed of the polymers of indene and of coumarone, and of mixtures of those polymers. For convenience it has been considered the chemical mechanism by which yellowing occurs in coumarone and indene polymers to be a fulvenation reaction in which there initially is a combination with oxygen accelerated by subjection to ultra-violet rays as in sunlight.

It has been the experience of the art that the initial purity of a coumarone-indene resin, by which is meant a resin composed of the polymers of indene or composed of the polymers of coumarone as well as a resin composed of mixtures of those polymers, takes place in spite of the greatest care which may be exercised to obtain a resin which initially is of high purity. Whereas the yellowing reaction which is termed fulvenation tends to occur during the progress of the condensation and polymerization reaction by which the polymers are formed to produce initially discolored or highly colored coumarone-indene resins, it occurs progressively in resins which by care exercised in their formation are initially of very light color. Taking a coumarone-indene resin which has been carefully prepared for maximum purity and which is initially thus of very light yellow coloration in a mass or lump, such resin is capable of producing a film which as initially deposited from solution is apparently colorless. This initially colorless film upon exposure to light and air will, however, rapidly and progressively darken until it has acquired a reddish brown or dark brown coloration.

It is the premise that this yellowing of coumarone and indene polymers occurs by aldehyde development in the terminal unit of the coumarone and indene polymers. Each such terminal unit, like the other units of the polymeric structure, has three double bonds in the benzene ring of the unit. Unlike the other units of the polymeric structure, however, it has an initial non-nuclear double bond lying outside the benzene ring or aromatic nucleus of the structure. Thus if we assume the formula for the indene monomer to be as follows:

*Formula A*

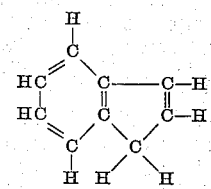

we have outside the benzene ring of the unit a point of unsaturation at which polymerization may take place. As it has been conceived the mechanism of polymerization by means of a catalyst, such for example as sulphuric acid, an addition product is first formed between indene monomers and the sulphuric acid, this action taking place in each monomer at the double bond outside the aromatic nucleus of the molecule. Subsequently two such addition products unite, splitting out the sulphuric acid catalyst but leaving a residual acid radical in the terminal unit of the dimer. Since the addition product is relatively unstable, this residual acid radical splits off to regenerate the double bond in the structure which it vacates. The same mechanism will occur in the case of trimers, tetramers, and higher polymers comprising any given number of monomeric units, the double bond in the structure outside the aromatic nucleus in the terminal unit of the polymer being regenerated as a final incident to the polymerization. This leaves the terminal indene unit in the following condition:

*Formula B*

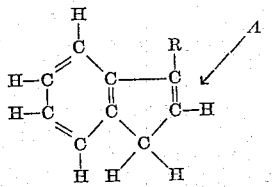

in which "R" represents the remainder of the polymeric structure comprising any given number of indene units. Similarly, the terminal unit of the coumarone polymer may be considered as having the following structure:

*Formula C*

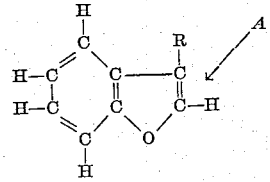

in which likewise "R" represents the remaining molecular structure of the polymer comprising any given number of coumarone units.

It may be taken as a fact that the polymerization of indene and of coumarone proceeds identically, although the tendency of the indene is to build up to polymers higher than those of the coumarone; that is to polymers comprising a greater number of monomeric units. Resins composed of a mixture of coumarone and indene polymers will, therefore, be taken herein as to mechanism of polymerization and discoloration, as also illustrative of resins formed of unmixed polymers of either coumarone or indene.

It is this double bond outside the aromatic nucleus in the terminal unit of the polymer which is susceptible to oxidation, and it is a hydrogen atom adjacent this double bond which reacts to form acids, aldehydes, and ketones. Both hydrogen atoms adjacent the double bond in question (in the monomer) are easily replaced by organic radicals, complexes, or residues either successively or simultaneously.

Since it will be understood that fulvenation, or discoloration, can be represented in terms of oxygen addition at this non-nuclear double bond of the terminal unit, it has been discovered that by blocking the possibility of oxygen combining with the terminal indene unit, the color development which is termed fulvenation can be precluded. Theoretically this can be accomplished in any manner which effects a saturation of the double bond which is outside of the aromatic nucleus, this double bond being designated "A" in the simplified formulae given above. Saturation at this point blocks the entire line of reaction steps by which discoloration proceeds, and the polymer saturate at such point indefinitely will retain its initial color.

It has been the experience that hydrogenation so conducted as to saturate substantially all the polymers of a polymerized body of indene at this point in the terminal units of the polymers, while giving a resinous body protected against discoloration, does not greatly increase the solubility of such body. Also, as an observation confirmatory of my premise as to the point of attack in an indene polymer to produce discoloration, it has been observed that the lower indene polymers, such as the indene dimers, discolor more rapidly than do the higher indene polymers and ultimately attain a deeper coloration. Whereas, saturation with hydrogen at the point "A" in the terminal unit of the indene polymers results in producing polymers which are protected against discoloration, but the solubility of which is not substantially increased, a general attack upon the polymers by means of hydrogen has a different effect. Thus if indene polymers be indiscriminately hydrogenated with saturation of a substantial proportion of the double bonds in the aromatic nuclei of the polymers, the solubility of the polymers may be greatly increased by a quantitatively great introduction of hydrogen, but to the extent that the specified non-nuclear double bonds of the polymers have not been saturated by contact with hydrogen, the polymers retain their capacity for the "yellowing" reactions.

In the hydrogenation of coumarone-indene resin and other resins metal hydrogenation catalysts of good activity, such as Raney nickel catalyst, have been largely employed. Raney nickel is an extremely active hydrogenation catalyst for the polymers of coumarone-indene resin in all orders of polymerization, and its action renders the progress of hydrogenation extremely difficult to control when that catalyst is used. Even though it be desired to saturate with hydrogen only the non-nuclear double bond outside the benzene ring or aromatic nucleus in the terminal unit of the several polymers of the resin, the activity of the catalyst causes hydrogen in some measure promiscously also to enter the double bonds throughout the polymers. Thus the hydrogenation of coumarone-indene polymers with Raney nickel catalyst tends to produce a resin which is of increased solubility, and also to produce a coumarone-indene resin which is of improved color stability by saturation of some of the non-nuclear double bonds outside the aromatic nuclei. In accordance with the above discussion, saturation of the double bonds in the aromatic nuclei has no effect in preventing color development in the polymers of the resin. This is true of all the coumarone-indene poylmers from the dimers to those polymers containing a great number of the indene or coumarone units. In order, therefore, to obtain a coumarone-indene resin of good color stability by hydrogenation with Raney nickel catalyst it is necessary to hydrogenate under such conditions as to effect substantially complete hydrogenation of the several polymers of the resin throughout their chemical structure. Otherwise there is marked lack of color stability in the hydrogenated resins.

By hydrogenation with Raney nickel catalyst so conducted as to obtain maximum hydrogen introduction into the resin molecules, the polymers of coumarone-indene resin can be saturated to a maximum of 93% to 94% complete saturation. Taking a relatively high-melting coumarone-indene resin, such as coumarone-indene resin melting close to 150° C. (cube in mercury), the ratio of non-nuclear, or alkene, double bonds to the total number of double bonds in the polymeric structure of the resin is 1 to 21 representing about 4.75% of the total initial unsaturation of the resin. Since, however, the hydrogenation as induced by the presence of Raney nickel catalyst is wholly indiscriminate in its attack on the molecular structure of the resin, this proportional hydrogenation means that a coumarone-indene resin 93% or 94% saturate with hydrogen has the color-forming non-nuclear, or alkene, double bonds in the terminal units of the polymeric structures only about 50% to 60% saturate, because of the probabilities of hydrogen contact involved in the indiscriminate effect induced by Raney nickel. The coloration of the bodies formed by the progress of the reactions initiated by oxidation in the resin are very intense, so that such color development in a minor proportion of the polymers composing the resin leads to a relatively intense yellowing effect. In order to produce a truly color-stable coumarone-indene resin, it is necessary, therefore, that hydrogen be introduced at the point of attack represented by the non-nuclear, or alkene, double bonds in the terminal unit of the polymeric structures in a proportion equal to 90% or more the number of such points of attack in the resin.

In the companion application Serial No. 512,785, filed December 3, 1943, there has been described a hydrogenation treatment of the resin with an oxide catalyst selected from the group consisting of copper chromite, nickel chromite, and iron chromite, and in companion application Serial No. 512,787, filed December 3, 1943, there has been described the hydrogenation of coumarone-indene resin under the influence of black copper oxide, either as used alone or in combination with the above noted chromite catalysts.

If it is desired, however, to obtain a resin which is in practical effect wholly color-stable and which has greatly increased solubility so that it is soluble in the aliphatic hydrocarbon solvents of very low solvent power, this result can not be attained either by hydrogenation solely in the presence of Raney nickel catalyst, or by hydrogenation solely in the presence of one of the special oxide catalysts above-noted. The Raney nickel catalyst, because of the indiscriminate action it promotes, is incapable of saturating completely the non-nuclear, or alkene, double bonds of the resin polymers, and the oxide catalysts, because of their moderate hydrogenation-inducing effect, are incapable sufficiently to introduce hydrogen into the benzene ring structures throughout the several units of the polymers, so to saturate the polymers as greatly to increase the solubility of the resin.

It has been discovered primarily, and the discovery is surprising, that the hydrogenation-inducing effects of Raney nickel catalyst and of the oxide catalysts above specified are complementary or supplementary, and that by hydrogenation under the combined influence of these catalysts, neither interfering with the hydrogenation induced by the other, a hydrogenation of the coumarone-indene resin polymers substantially complete as to saturation of the non-nuclear, or alkene, double bonds in the terminal units of the polymers and complete in a desired order as to the introduction of the hydrogen into the benzene ring structures of the polymers may be effected. By utilizing the combined effect of these catalysts one is able to obtain a truly color-stable resin saturate to within 1% of completion and having correspondingly high solubility, or if so desired can obtain a truly color-stable coumarone-indene resin saturate as to the benzene ring structure of its polymers in any such minor or intermediate order as may give a desired measure of solubility. In accordance with the procedure usually preferred, there has been completely hydrogenated the terminal unit of all the molecules of the coumarone-indene resin and hydrogenate the remaining polymer structure of the resin in sufficient order to give a practical order of solubility for any reasonably intended purpose.

It is to be understood in hydrogenating coumarone-idene polymers with both metallic nickel and an oxide catalyst composed primarily of an oxide selected from the class composed of copper chromite, iron chromite, nickel chromite, and black copper oxide, the metal catalyst and the oxide catalyst neither of them tends to inhibit the action of the other, and the hydrogenation induced by one class of catalysts does not preclude further hydrogenation induced by the other. Thus hydrogenation of the resin may be conducted under the simultaneous effect of metallic nickel and oxide catalyst; and hydrogenation may be conducted first with metal nickel and then oxide catalyst, or this order may be reversed. Economy in procedure usually is obtained by using catalysts of both classes simultaneously, as this may be done without prejudice to the selective approximately complete saturation of the terminal alkene double bond.

In order to illustrate the highly selective effect of the above-noted oxide catalysts in completely hydrogenating the terminal units of the polymers included in the coumarone-indene resin, and to illustrate the fact that coumarone-indene resin very highly hydrogenated under the influence of Raney nickel catalyst still possesses the capacity of color development in a substantial order, there may be given the following examples:

*Example 1*

Taking 100 cc. of benzine I placed it in a hydrogenation bomb with 5 grams of copper chromite, and hydrogen was run in under pressure. The operating temperature was 100° C.; the initial pressure in the bomb was 1000 lbs. per square inch; and the final pressure was likewise 1000 lbs. per square inch. The actual consumption of hydrogen was nil. This is a very clear exemplification of the fact that hydrogen does not cause hydrogenation in a benzene ring structure under the influence of a chromite catalyst.

*Example 2*

63 grams of indene (monomeric) and 51 grams of refined crude heavy solvent naphtha, i . e., high-flash solvent naphtha, were placed in a hydrogenation bomb with 10 grams of copper chromite, and hydrogen was run in under pressure. The operating temperature was 100° C.; the initial pressure was 1435 lbs. per square inch; and the final pressure was 1220 lbs. per square inch. The actual consumption of hydrogen was 11,700 cc. The theoretically anticipated hydrogen consumption in this treatment is 11,760 cc.

The significance of the quantity of hydrogen consumed in the treatment should be explained. This explanation is that the indene monomer has four double bonds representing four points of attack. The non-nuclear double bonds represent 25% of the points of attack present, or a ratio of 1 to 4 with respect to the total saturation of the indene. The theoretically possible complete unsaturation of the indene alone is four times 11,760 cc., or 47,040 cc. of $H_2$. The 51 grams of refined high-flash naphtha consists substantially of structures composed of a benzene ring with saturate aliphatic side chains, which side chains are incapable of hydrogenation. Theoretically, the high-flash solvent is capable of absorbing a relatively great volume of hydrogen, and under the influence of Raney nickel catalyst, does so. The small hydrogen consumption which resulted from the treatment with chromite catalyst showed that hydrogen had not been introduced either into the benzene rings of the indene, or into the benzene rings of the refined solvent naphtha.

Example 3

100 grams of coumarone-indene resin having a melting point of 150° C. (cube in mercury) was placed in the hydrogenation bomb with 10 grams of Raney nickel metal catalyst and 110 cc. of petroleum benzine. The maximum temperature of the operation was 200° C. The initial pressure was 1305 lbs. per square inch and the final pressure was 540 lbs. per square inch. The total absorption of hydrogen was 54,800 cc. of $H_2$ gas. With the specific coumarone-indene resin used in the example, the average number of units in the coumarone-indene polymers is 6.67. The total hydrogen consumption thus represents 93% of total hydrogenation of the coumarone-indene resin including both the benzene rings and the single terminally contained, or alkene, double bond of the polymer structures.

The treated resin was not a truly color-stable resin, but exhibited a substantial discoloration from its initial water-white condition to from one-quarter to one-half color on the Barrett coal tar resin color scale when subjected to ultra-violet light in a "weathermeter" for 12 hours. This color development resulted from the remaining 40% to 50% unsaturation of the resin molecules in their terminal units.

Example 4

100 grams of coumarone-indene resin of exactly the same quality as that treated in Example 3, having a melting point of about 150° C. (cube in mercury), and 100 cc. of petroleum benzine were placed in the bomb with 10 grams of copper chromite catalyst, and hydrogen was run in under pressure. The operating temperature of the reaction was close to 200° C. The initial pressure was 630 lbs. and the final pressure was 550 lbs.

The actual consumption of hydrogen was 3005 cc., which gives a ratio of 4.94% the total volume of hydrogen which would have been absorbed had all the double bonds of all the molecules been saturated. The result indicates complete saturation at the terminal non-nuclear double bond of all the polymers of the resin, with but .19% of the total hydrogen required wholly to hydrogenate the double bond unaccounted for. The resin showed no discoloration when subjected to ultra-violet light in a "weathermeter" for 48 hours.

Example 5

Taking a coumarone-indene resin having a melting point of 150° C. (cube in mercury), which had been hydrogenated to about 93% of completion in the presence of Raney nickel catalyst to leave about 50% residual unsaturation in the non-nuclear double bonds of the terminal units, 100 grams of this resin was placed in the bomb with 100 cc. of petroleum benzine and 10 grams of copper chromite, and hydrogen was run in under pressure. The progress of the hydrogenation reaction was as follows:

| Time | Temp. | Press. |
| --- | --- | --- |
| 11:25 | 14 | 1,020 |
| 11:30 | 14 | 1,010 |
| 11:45 | 49 | 1,125 |
| 12:00 | 76 | 1,215 |
| 12:05 | 87 | 1,265 |
| 12:10 | 97 | 1,295 |
| 12:15 | 97 | 1,295 |
| 12:20 | 99 | 1,300 |
| 12:25 | 104 | 1,335 |
| 12:35 | 124 | 1,400 |
| 12:45 | 140 | 1,430 |
| 12:55 | 154 | 1,485 |
| 1:05 | 158 | 1,490 |
| 1:20 | 161 | 1,500 |
| 1:30 | 158 | 1,490 |
| 1:40 | 155 | 1,485 |
| 2:05 | 157 | 1,490 |
| 2:14 | 15 | 990 |

Calculation of the cc. of hydrogen used indicated that 1470 cc. went into the point where the residual double bond is located. An initial total of 2890 cc. of hydrogen is calculated as being required wholly to saturate at this point. The consumption of 1470 cc. shows, therefore, that the residual 50% unsaturation had been in substantial entirety eliminated to give a resin completely saturate at the non-nuclear double bond in the terminal unit of its molecules.

The resin used in this experiment, that is coumarone-indene resin melting close to 150° C. (cube in mercury), initially had a solubility, in accordance with the test hereinafter explained, of 54° C. in petroleum benzine. After hydrogenation approximately as completely as is possible with Raney nickel catalyst, its solubility in petroleum benzine was about −10° C. The resin did, however, retain its capacity to yellow, and the sample used in this particular example had yellowed from a clear, colorless resin to about one-fourth color on the coumarone-indene color scale before hydrogenation treatment induced with the copper chromite catalyst. After this second hydrogenation it showed no trace of color development upon exposure to ultra-violet light in a "weathermeter" for 48 hours.

In exemplifying the invention by means of the several following examples, and the examples given above, there has been utilized a uniform procedure in order that the results may be comparative in their illustration. In the procedure of all the examples, a standard hydrogenation bomb was used; the resin was ground, and the ground resin, together with solvent and catalyst, was placed in the bomb and the bomb then closed. Hydrogen gas was admitted to the bomb from a suitable supply, as from cylinders of compressed hydrogen, at the pressure desired for each particular experiment. The whole assembly was then placed in rotating mechanism of suitable, well-known kind and was warmed by gas burners. The bomb which was used is fitted with a thermometer well carrying a thermometer in the usual manner.

During the progress of the hydrogenation, the rotating mechanism was stopped at intervals to observe data as to time, pressure, and temperature. When the reaction was completed, as indicated by cessation of pressure drop within the bomb, the temperature was restored to its initial volume and the pressure was again observed. The bomb was vented down to atmospheric pressure, and its contents were removed. The catalyst was removed from the reaction solution by filtration, and the solvent was removed by steam distillation. This procedure yields a molten residual resin which is poured into a pan to harden.

Except in those instances in which some element of the reaction mixture was omitted for the purpose of checking the essential features, or in which certain observations were considered unnecessary, the foregoing procedure was in every instance followed. Also, in operating to obtain recordable data, the usual precautions were taken to insure that the experiments were as quantitative as possible, and each bomb, therefore, was carefully calibrated to volume and the volume of the reaction mixture deducted from it. The figure so secured represented the hydrogen gas volume in the bomb, from which calculation gave the number of cubic centimeters of hydrogen gas employed. This volume was compared with the expected or theoretical volume based on the resin subjected to treatment, and the approximate averaged molecular weight of the polymers hydrogenated.

Taking Example 5 as illustrative of the procedure, the example shows a pressure drop of 30 lbs., the bomb had a volume of 920 cc., and the volume of the charge was 200 cc., being a volume of 720 cc. for the hydrogen gas. 30 lbs. divided by 14.7 (1 atmosphere of pressure) equals 2.04. This multiplied by 720 gives the 1470 cc. of hydrogen gas consumed as above described. This conforms very closely to the 2890 cc. of hydrogen gas which would be required to saturate the terminal alkene double bonds of the polymers. The average molecular weight of the coumarone-indene resin melting close to 150° C. (cube in mercury) is approximately 775, and 100 grams of the resin is 0.13 mol. A total of 60,690 cc. is therefore required to saturate out all the double bonds of the resin molecules.

The average molecular weight of the coumarone-indene resin being 775, the number of units in the resin molecules averages about 6.67. Two atoms of hydrogen are needed to saturate the non-nuclear double bond of each polymer, and there are three double bonds in the benzene ring of each unit of the resin molecule. Remembering that the average number of units in the polymer of this resin is 6.67 and remembering the unit and polymer structure of the resin, it will require $3n+1$ mols. of hydrogen wholly to saturate each resin molecule. In this instance $n$ being 6.67, a total of 21 mols. is required wholly to saturate the benzene ring, or aromatic nucleus of such average resin molecule, as well as the non-nuclear terminal of the molecule. The ratio of hydrogen required to eliminate the non-nuclear double bond to that required wholly to saturate the molecule is 1 to 21, which is 4.75% of the maximum potential hydrogen consumption, and 4.75% of 60,690 cc. is about 2890 cc.

It is to be understood that in the ratio presented by the expression "1 to $3n+1$" $n$ is a variable which represents the average number of units in the molecules of any coumarone-indene resin under consideration.

*Example 6*

A further experiment was conducted to show that even when hydrogenation is carried far toward completion by treatment with Raney nickel the major hydrogenation has been in the benzene rings of the coumarone-indene resin, and that the relatively complete nature of hydrogenation with Raney nickel does not inhibit further hydrogenation with a suitable oxide catalyst to bring the hydrogenation yet closer to totality.

The resin treated in this example was 100 grams of a coumarone-indene resin initially having a melting point of 150° C. (cube in mercury), which had been subjected to a hydrogenation treatment with 10 grams of Raney nickel catalyst and 100 cc. of petroleum benzine solvent for approximately 7 hours, with an initial pressure of 1305 lbs. per square inch, and a maximum temperature of about 225° C. The final pressure was 200 lbs. per square inch. Under such severe and prolonged conditions, the resin took up about 58,600 cc. of $H_2$ gas with respect to a theoretical possible 60,690 cc., or about 96% of the theoretical maximum.

Taking 50 grams of this hydrogenated resin together with 100 cc. of petroleum benzine and 5 grams of copper chromite, the resin solution was treated in the bomb with gaseous hydrogen under an initial pressure of 1005 lbs. per square inch. The maximum temperature was close to 156° C. The final pressure was 955 lbs. per square inch.

The result was that 285 cc. of hydrogen gas entered the resin. This gas was directed almost solely to the terminally presented double bonds of the resin molecules. The initial proportion of double bonds in the resin, which is approximately 40 points in the benzene rings of each molecule to 2 points in the terminal structure of the molecule, shows that these terminal points had been saturated only about 80% by the initial 96% hydrogenation of the resin, 20% of the terminal unsaturation remaining after treatment with the Raney nickel catalyst.

Further calculation shows that by the sum of the hydrogenation treatments the resin had been made to absorb approximately 20.8 mols. of hydrogen out of a theoretically possible 21 mols., and that the percentage of the total hydrogenation was well over 99%. The completely treated resin shows no trace of yellowing when exposed to ultra-violet light in a "weathermeter" for 48 hours.

*Example 7*

In order to show that the order of the hydrogenation steps is not vitally material, I took an unhydrogenated coumarone-indene resin having a melting point of 150° C. (cube in mercury) and hydrogenated that resin with copper chromite catalyst, using 100 grams of the resin, 10 grams of copper chromite catalyst, and 100 cc. of petroleum benzine. The operating temperature of the reaction was close to 157° C. The initial pressure was 1010 lbs. per square inch, and the final pressure was 950 lbs. per square inch. The actual consumption of hydrogen was 2940 cc., which gives a ratio of 4.84% to the total volume of hydrogen which would have been absorbed had all the double bonds of the molecules been saturated.

This chromite-hydrogenated resin was subjected to hydrogen treatment with Raney nickel catalyst under the conditions comprised in the first stage of Example 6, which hydrogenation treatment was, as stated, particularly thorough. The treatment was conducted on 100 grams of the partially hydrogenated resin with 10 grams of Raney nickel catalyst and with 100 cc. of petroleum benzine solvent. The treatment was continued for approximately 7 hours, beginning with an initial pressure of 1305 lbs. and a maximum temperature of about 225° C. The final pressure was 200 lbs. per square inch. In the first stage of the treatment the resin which previously had taken up about 2940 cc. of hydrogen took up under the severe conditions of the treatment with Raney nickel about 57,400 cc. of hydrogen to give a total hydrogen absorption of 60,400 cc., which is very close to 100% of the theoretically possible hydrogen absorption.

Increased temperature after a certain stage of hydrogenation has been attained is of advantage in carrying the hydrogenation reaction further. In the ambit of this present invention, advantage can be taken of that fact by first carrying out hydrogenation with copper chromite or other oxide catalyst of the class disclosed, and then raising the temperature while using Raney nickel catalyst in the second stage of the hydrogenation. It will be noted that this is the procedure followed in Example 7.

As a further check, I conducted the following experiment under somewhat more severe conditions for the hydrogenation treatment with oxide catalyst, and with a shorter time of treatment with Raney nickel catalyst:

Example 8

150 grams of coumarone-indene resin having a melting point of 150° C. (cube in mercury) was subjected to hydrogenation in a bomb with 10 grams of copper chromite and 150 cc. of petroleum benzine. The initial pressure was 1210 lbs., and the final pressure was 1100 lbs. The maximum temperature was 190° C., and the time of treatment was 4 hours. 4360 cc. of hydrogen was consumed as compared with the theoretical 4350 cc. required to saturate the double bonds in the terminal units of the resin molecules, the saturation being thus 107% on the basis of those double bonds. The hydrogenation was 5.1% with respect to complete saturation of all the double bonds in the resin molecules.

Taking 75 grams of the chromite-hydrogenated resin, it was treated in the bomb with 10 grams of Raney nickel catalyst and 80 cc. of petroleum benzine solvent. The initial pressure of the treatment was 1315 lbs. and the final pressure was 505 lbs. The total time of treatment was 5 hours, and the maximum temperature was 226° C. In this second stage of the treatment, 42,200 cc. of hydrogen was consumed, which is about 96.5% the total possible amount that can enter into the aromatic rings of the resin molecules. 19.3 mols. of hydrogen entered as compared with the 20 mols. still theoretically possible. Combining the 96.5% saturation of the aromatic rings affected by the Raney nickel catalyst treatment with the apparent slight effect on those rings by the excess hydrogenation in the first stage of the treatment, the total is about 98% of the theoretical total hydrogenation of the resin. This gives a practical treatment for obtaining a resin which is absolutely non-yellowing and which has very high solubility in solvents of weak solvent power. It may be noted that the resin treated in Example 7 and the resin treated in Example 8, neither of them showed any trace of yellowing when exposed to ultra-violet light in a "weathermeter" for 48 hours, and that both showed solubility far below 0° C. in petroleum benzine.

There is a certain advantage in conducting a dual hydrogenation treatment with Raney nickel and with copper chromite, or its equivalent, catalyst in two separate stages. By so doing, a resin which has received a treatment of one sort can be stored and subsequently subjected to the other sort of treatment. A coumarone-indene resin treated as with copper chromite will not lose in storage the ability to resist yellowing attendant upon that treatment, and can subsequently be treated for increased solubility by hydrogenation conducted in the presence of Raney nickel. Also, a coumarone-indene resin which has been treated with Raney nickel will not lose its solubility characteristics with passage of time. It will in measure yellow, but such discoloration as shall have developed is cured by the same hydrogenation treatment with suitable oxide catalyst which prevents future yellowing in the resin. Also, because of its selectivity, an effective oxide hydrogenation catalyst, such as copper chromite, nickel chromite, iron chromite, or black copper oxide, does not tend to induce hydrogenation in certain solvents, such as unsaturated solvents of the single ring type, which, for that reason, desirably are not used in hydrogenation treatments utilizing Raney nickel as the catalyst. Thus, a number of solvents, such as methyl-cyclohexane, ethyl-acetate, petroleum benzine, diethyl-ether, and dibutyl-phthalate, all can be used satisfactorily as solvents for the resin in the hydrogenation treatment utilizing copper chromite or its substantially equivalent catalyst. In general, for hydrogenation of that sort, there may be used solvents which fall within the classes of cyclo-paraffins; aliphatic esters; straight chain paraffins; ethers; and aromatic acid esters.

Commonly, however, it is the least expensive procedure to include both an effective oxide catalyst and Raney nickel catalyst in a hydrogenation charge of coumarone-indene resin, using a solvent which is incapable of hydrogenation under the conditions of the process in the presence of Raney nickel catalyst, and desirably utilizing an intermediate temperature increase to or above 200° C. to promote hydrogenation in the terminal units of the resin polymers under the hydrogenation-inducing effect of the oxide catalyst. The following example gives a number of comparative and definitive runs. In all of those runs which include both Raney nickel catalyst and copper chromite, both catalysts were simultaneously present in the bomb during the hydrogenation treatment, neither inhibiting the action of the other in the general hydrogenation effect induced by the Raney nickel, or the selective hydrogenation effect induced by the copper chromite.

It is to be understood that in all those examples in which copper chromite was used in a proportion of 5% or more the weight of the resin, the product resin was non-yellowing, showing no yellowing tendency upon exposure to ultra-violet light in a "weathermeter" for 48 hours. The table gives comparatively, however, the solubility of the different product resins, the hydrogenation of which was differently catalyzed throughout the line of comparative runs. For convenience, all of these experiments, or runs, are compiled in a table. In the four columns listed under "hydrogenator charge," the one to the left is headed "R" to designate the weight of the resin in grams; the next adjacent column is headed "CuCrO" to designate the weight of copper chromite catalyst in grams; the third column to the left is headed "N" to designate the weight of Raney nickel catalyst in grams; and the fourth column, or the one furthest to the right, is headed "PB" to designate the quantity of petroleum benzine solvent in cubic centimeters.

It is to be understood that the resin used in all these runs was coumarone-indene resin unaltered by previous treatment, having a melting point of 150° C. (cube in mercury), and a solubility in petroleum benzine of 54° C.

*Example 9*

| Run No. | Hydrogenator charge | | | | Initial press. | Final press. | Max. temp. | $H_2$ in cc. consumed | Solubility in pet. ben. |
|---|---|---|---|---|---|---|---|---|---|
| | R | CuCrO | Ni | PB | | | | | ° C. |
| (A) | 100 | 10 | 00 | 100 | 810 | 800 | 220 | 536 | 48 |
| (B) | 100 | 10 | 00 | 00 | 820 | 765 | 226 | 3,080 | 46 |
| (C) | 100 | 10 | 09 | 100 | 1,000 | 935 | 160 | 3,180 | 46 |
| (D) | 100 | 10 | 00 | 100 | 940 | 860 | 226 | 4,300 | 46 |
| (E) | 100 | 10 | 05 | 100 | 1,000 | 900 | 206 | 4,900 | 44 |
| (F) | 100 | 10 | 10 | 100 | 925 | 800 | 220 | 6,120 | 44 |
| (G) | 100 | 10 | 03 | 100 | 1,175 | 1,030 | 227 | 7,150 | 44 |
| (H) | 100 | 05 | 07 | 100 | 890 | 740 | 217 | 8,050 | 42 |
| (I) | 100 | 10 | 03 | 100 | 1,130 | 975 | 225 | 8,300 | 45 |
| (J) | 100 | 10 | 05 | 100 | 1,200 | 1,035 | 232 | 8,870 | 43 |
| (K) | 100 | 10 | 04 | 100 | 1,000 | 830 | 220 | 8,820 | 43 |
| (L) | 100 | 10 | 03 | 100 | 1,000 | 810 | 222 | 10,200 | 43 |
| (M) | 100 | 10 | 02 | 100 | 1,190 | 1,000 | 224 | 10,200 | 44 |
| (N) | 100 | 10 | 06 | 100 | 1,010 | 780 | 225 | 11,280 | 41 |
| (O) | 100 | 10 | 02 | 100 | 1,070 | 860 | 223 | 11,270 | 44 |
| (P) | 100 | 10 | 05 | 100 | 1,010 | 800 | 225 | 11,260 | 43 |
| (Q) | 100 | 10 | 05 | 100 | 1,135 | 890 | 222 | 13,150 | 44 |
| (R) | 100 | 10 | 10 | 100 | 1,210 | 925 | 224 | 15,300 | 25 |
| (S) | 100 | 10 | 04 | 100 | 1,130 | 735 | 223 | 18,850 | 41 |
| (T) | 100 | 00 | 10 | 100 | 1,190 | 820 | 194 | 19,850 | 27 |
| (U) | 100 | 10 | 10 | 100 | 1,185 | 710 | 178 | 23,250 | 13 |
| (V) | 100 | 10 | 08 | 100 | 860 | 415 | 213 | 23,900 | 22 |
| (W) | 100 | 10 | 10 | 100 | 1,190 | 700 | 181 | 24,000 | 16 |
| (X) | 100 | 10 | 10 | 100 | 969 | 440 | 220 | 25,500 | −3 |
| (Y) | 100 | 00 | 10 | 100 | 1,190 | 650 | 212 | 26,500 | −10 |
| (Z) | 100 | 10 | 10 | 100 | 1,220 | 500 | 216 | 35,300 | −34 |

The above makes it clear that the benefit derived from treatment with copper chromite is almost entirely in effecting permanent color stability in the resin, and that the benefit derived from hydrogenation with Raney nickel catalyst is preponderantly improvement in the solubility of the resin.

Improvement in the solubility of resins is important. Poor solubility generally results in precipitation of the resin from solution in the case of a substantial temperature drop, such as is frequently encountered in an unheated warehouse. Such precipitation spoils the material and is one of the major reasons why coumarone-indene resins are not extensively used in varnishes, paints, and like compositions in which it is usual to include some proportion of the low-priced petroleum solvents. Improving the solubility of the resins so that they will remain in solution in petroleum solvents at low temperatures greatly increases the value of coumarone-indene resins.

Referring particularly to Example 9 above, the solubility of the treated resins is given in degrees centigrade. The determination of such solubilities is in accordance with a test which has become standard for soluble resins. In that test, the resin is dissolved in an equal weight of petroleum benzine, the sort known as Stoddard solvent being specified for purposes of accurate comparison in the results. The solution is made with heating and is then cooled back in a vessel having a thermometer mounted in usual manner. The temperature at which the first cloud appears is taken as indicating the solubility of the resin.

It has been explained above that complete saturation of the coumarone-indene resin specifically used for purposes of exemplification requires the introduction of about 60,690 cc. of hydrogen for each 100 grams of the resin. When approximately 20,000 cc. of hydrogen have been introduced, a sharp drop thereafter occurs in the solubility value (minimum temperature for a clear solution) of the resin. Up to this point, introduction of hydrogen has little effect in improving solubility, so that the selective hydrogenation induced by copper chromite, of itself, leaves the solubility characteristics of the coumarone-indene resin approximately unchanged. With additional quantities above 20,000 cc. of hydrogen introduced into the resin by the random effect induced by Raney nickel catalyst, substantial improvement in solubility results. For many purposes it has been discovered that the introduction of approximately 25,000 cc. of hydrogen confers sufficient solubility for the intended purpose, and it may be noted that this corresponds only to about 42% of the amount of hydrogen absorption resulting from hydrogenation induced by Raney nickel alone. This invention is thus of substantial importance in coumarone-indene resins intended for purposes in which color-stability of the resin should approach the absolute, but in which moderate improvement in solubility is adequate.

The following summary is based on the same resin which has been heretofore considered with respect to the chemical composition of that resin:

| Amount or extent of hydrogenation | Percentage carbon | Percentage hydrogen | Important characteristics of polymer finally obtained |
|---|---|---|---|
| Original indene resin; with no hydrogen treatment. | 93.10 | 6.90 | Yellows very badly and has poor solubility in petroleum benzine. |
| Two atoms of $H_2$ added at lone double bond, in terminal unit. | 92.87 | 7.13 | Yellowing tendency considerably reduced to nearly zero; solubility improved by about 6° C. |
| 13 atoms of $H_2$ added. | 91.29 | 8.71 | Yellowing reduced, with solubility improved only about another 6° C. |
| 27 atoms of $H_2$ added. | 88.29 | 11.71 | Yellowing reduced, with solubility much below minus 63° C., where the test is no longer applicable. |

In ordinary practice, it has been found useful improvement results from hydrogenating the resin in the presence of catalysts of both sorts only in an order which gives a non-yellowing coumarone-indene resin having a solubility of about −6° C. Coumarone-indene resins which have been hydrogenated in an order approaching completeness act as solid solvents and have the unexpected property of serving as vehicles for carrying unhydrogenated coumarone-indene resins into solution. This can be demonstrated by blending two resins in equal proportions by weight, and determining the solubility of the blend in petroleum benzine. Taking for example the resin hydrogenated in run "Z" of Example 9, which resin had absorbed 35,300 cc. of hydrogen and had a solubility of −34° C., that resin was mixed in equal proportions with a sample of the starting resin having a solubility of 54° C. In the blend of these two resins, the average added hydrogen content is 17,650 cc. Theoretically, such blend should have a solubility value of about 39° C., but an actual determination shows it to have a solubility of 29° C. Thus in one sense the presence of some hydrogenated resin may be said to depress the solubility temperature of the remaining unhydrogenated resin to produce what may be termed a self-fluxing or self-solubilizing property.

In the case of the low molecular weight coumarone-indene resin, of which the extreme example is the coumarone-indene dimer oil composed of coumarone-indene dimers, usually with some inclusion of the trimers of coumarone and indene, it is not important for most purposes to improve the solubility of the material. For this reason, a hydrogenation treatment induced wholly by the presence of copper chromite, or one of its substantially equivalent catalysts, usually is adequate. This oily resin is used extensively as a softener for resins and as a tack-producer in adhesive compositions. Being composed of dimers in which there is a terminally disposed double bond for each two indene and coumarone units, it is highly susceptible to yellowing, and it is therefore important to make it non-yellowing by hydrogenation with one of the above noted oxide catalysts, as in the companion applications Serial No. 512,785, filed December 3, 1943, and Serial No. 512,787, filed December 3, 1943.

Hydrogenation conducted with both oxide hydrogenation catalyst and Raney nickel catalyst gives as a product a clear, colorless oily resin which is non-yellowing. Complete, or approximately complete, hydrogenation of an oily resin composed chiefly of coumarone and indene dimers is undesirable for some purposes; but there is, for some uses, utility in subjecting a resin of this sort to hydrogenation under the conjoint hydrogenation-inducing effects of Raney nickel catalyst and one of the effective oxide catalysts, as for use in perfume bases and for use with rubber resins such as gutta-percha.

The following comparative examples will illustrate the difference in hydrogenating coumarone-indene dimer oil under the influence of a chromite catalyst alone, and hydrogenating that dimer oil in the presence of chromite catalyst and also in the presence of a small proportion of Raney nickel.

*Example 10*

100 grams of coumarone-indene dimer oil was placed in the bomb with 10 grams of copper chromite and without solvent. Hydrogen was run in. The initial pressure was 1100 lbs. per square inch and the final pressure was 910 lbs. per square inch. The maximum temperature of the hydrogenation treatment was 225° C. and the time of treatment was 2 hours.

This treatment resulted in taking up 11,500 cc. of hydrogen as compared with 9,800 cc. of hydrogen theoretically required to hydrogenate all the double bonds of the dimer oil. The percentage treatment with respect to the terminal non-nuclear double bonds of the dimer oil was, therefore, 118%. The oily coumarone-indene resin so hydrogenated showed but slight yellowing when subjected to ultra-violet light in a "weathermeter" for 48 hours.

*Example 11*

In this example, coumarone-indene dimer oil was hydrogenated under the simultaneous influence of copper chromite and Raney nickel catalysts. In it the charge for the bomb was composed of 100 grams of coumarone-indene dimer oil, 15 grams of copper chromite, and 2 grams of Raney nickel suspended in 44 cc. of petroleum benzine. The initial pressure was 1150 lbs. per square inch and the final pressure was 350 lbs. per square inch. The maximum temperature was 222° C. and the time of treatment was 5 hours.

The treatment resulted in 52,300 cc. of hydrogen being taken up by the dimer oil, indicating that the benzene rings of the coumarone-indene polymers, as well as the non-nuclear terminal double bonds of the polymers, had been preponderantly saturated with hydrogen.

The foregoing specific examples are directed to the use of copper chromite as the hydrogenation catalyst. Copper chromite is the preferred example of a group of metal chromite hydrogenation catalysts comprising copper chromite, iron chromite, and nickel chromite. This catalyst group is not susceptible of generic classification by class or group in the periodic system of the metals comprised in the chromites. In the sense of the invention, the communal property of these specific metals resides in their ability to form chromites which are effective as selective hydrogenation catalysts for coumarone and indene polymers.

The copper chromite is in the form of a black powder which is crushed and sifted to render it uniform for use as a catalyst. It is noteworthy that no special care of the catalyst is required; that is, it does not have to be preserved under special conditions as is the case with Raney nickel catalyst.

Unless the conditions of the process are such that the Raney nickel will effect some substantial hydrogenation of the non-nuclear double bonds of the several coumarone-indene resin polymers, it is desirable to use 5% to 15% of copper chromite catalysts, or of its substantial equivalent, to each 100 grams of resin. Although a percentage of the catalyst greater than 15% may be used, such greater percentage is, under most circumstances, unnecessary and performs no commensurately improved function in the hydrogenation reaction. Although lesser amounts of Raney nickel catalyst may be used, the teaching of the several examples, and particularly of Example 9, is that it is desirable to hydrogenate in the presence of from 5% to 15% of Raney nickel if a product of good solubility is desired. Because of the complementary effect of the two catalyst classes, this proportion is independent of the quantity of oxide catalyst (copper chromite, nickel chromite, iron chromite, or black copper oxide) which is cooperatively used.

It has been noted above that one may utilize either iron chromite or nickel chromite instead of copper chromite from the group comprising those three chromites as the hydrogenation catalyst. Black copper oxide should also be included in that group, because it has been found to act efficiently as a hydrogenation catalyst for coumarone and indene polymers, even when it is not associated with chromium oxide as above. The following examples exemplify specifically the hydrogenation-inducing effect of the three latter catalysts. The exemplification as given is not directly associated with hydrogenation by means of Raney nickel catalyst. It is to be understood, however, that any one of the three may be substituted for copper chromite in the previous examples in which Raney nickel is additionally used, with results proportional to the effectiveness of each of these several other oxide catalysts as compared with the effectiveness of copper chromite.

*Example 12*

A charge composed of 100 grams of coumarone-indene resin, melting at 150° C. (cube in mercury), 10 grams of iron chromite, and 100 cc. of the aliphatic solvent "Varnolene" were subjected in a hydrogenation bomb to gaseous hydrogen. The maximum temperature of the hydrogenation reaction was 122° C. The initial pressure was 1830 lbs., and the final pressure was 1780 lbs. The hydrogen consumption was 2920 cc.

By the calculations above given, this showed that hydrogen had entered the resin molecules in a percentage of 4.81%, that theoretically required to saturate all the double bonds of the polymers. A sample of the resin tested without further hydrogen under the influence of Raney nickel was non-yellowing, showing no indication of yellowing upon exposure to ultra-violet light in a "weathermeter" for 48 hours.

*Example 13*

A charge composed of 100 grams of coumarone-indene resin melting at 150° C. (cube in mercury), 10 grams of nickel chromite, and 100 cc. of the aliphatic solvent "Varnolene" were subjected to hydrogenation in a bomb. The maximum temperature was 100° C. The initial pressure was 1390 lbs. and the final pressure was 1345 lbs. The hydrogen consumption was 2370 cc.

On the basis of the calculations given above, this indicated that the resin had been hydrogenated to an extent equal to 4% the theoretically possible hydrogenation to saturate all the double bonds of the resin molecules. Although the hydrogenation of this example falls short of theoretically complete saturation of the non-nuclear double bonds of the resin molecules, a sample of the resin tested without further hydrogenation under the influence of Raney nickel catalyst showed color-development to but slightly greater depth than occurred in the products of hydrogenation induced by copper chromite when subjected to ultra-violet light in a "weathermeter" for 48 hours. As hydrogenation induced with Raney nickel catalyst is indiscriminate, rather than selective, the supplementary effect of such hydrogenation combined with the selective hydrogenation with iron chromite gives a resin which is wholly non-yellowing under long continued exposure to ultra-violet light.

*Example 14*

A charge composed of 100 grams of coumarone-indene resin melting at 150° C. (cube in mercury), 10 grams of black copper oxide, and 100 cc. of petroleum benzine were subjected to gaseous hydrogen in a bomb. The maximum temperature of the hydrogenation reaction was 159° C. The initial pressure was 1290 lbs. and the final pressure was 1230 lbs. The actual consumption of hydrogen was 3220 cc.

On the basis of the calculations given above, this indicated a hydrogenation equal to 5.27% that theoretically possible if all the double bonds of the resin molecules had been hydrogenated.

A sample of the resin so hydrogenated was non-yellowing, giving no indication of discoloration when subjected to ultra-violet light in a "weathermeter" for 48 hours.

The method of the present invention is thus the hydrogenation of coumarone-indene resins in the presence of hydrogenation-inducing catalysts of two different classes. One catalyst class is represented by Raney nickel catalyst, and the other catalyst class is represented by copper chromite, iron chromite, nickel chromite, and black copper oxide. As explained above, hydrogenation in the presence of catalysts of these two classes may be simultaneous or sequential. In either case it is not necessary that but one catalyst of the oxide class be used in effecting the selective hydrogenation which they induce. Hydrogenation may be conducted in the presence of two or more catalysts of this class, whether or no Raney nickel simultaneously is present. In fact, the action of each of them seems to be more energetic in the presence of another. For example, the hydrogenation of coumarone-indene resin to saturate the terminal double bonds of all the resin polymers proceeds more readily to completion in the presence of 8% copper chromite and 4% black copper oxide than in the presence of 12% copper chromite without regard to the presence or absence of Raney nickel.

It is an important advantage of the disclosed class of oxide hydrogenation catalysts that by their use non-yellowing coumarone-indene resins can be produced by hydrogenation at temperatures far below those commonly employed in the catalytic hydrogenation of resins. Whereas it has been usual in the past to effect such reactions at temperatures of 200° C. and higher, the oxide catalysts (copper chromite, iron chromite, nickel chromite, and black copper oxide) give good results at temperatures within the approximate range of 100° C. to 175° C. and even at temperatures as low as 70° C. or 75° C. The utilization of low temperatures for hydrogenation in the presence of the disclosed oxide catalysts is exemplified specifically in the companion application Serial No. 512,785, filed December 3, 1943.

It has, however, been noted that relatively elevated temperature is useful in carrying the hydrogenation forward beyond the stage of approximately complete saturation of the non-nuclear double bonds, and hydrogenation under the influence of Raney nickel particularly is energized by temperatures close to or above 200° C. It is therefore desirable in the conjoint hydrogenation herein disclosed to hydrogenate at low temperature, up to about 200° C., in the stage of the process in which the oxide catalyst is effective, and to use higher temperature up to 225° C., or even higher, for that hydrogenation which the Raney nickel catalyst induces. This holds true whether catalysts of the two classes be used separately or simultaneously. In no case has it been found desirable to use a pressure substantially in excess of 2100 lbs. per square inch.

It is to be understood that in the foregoing where melting point is given without qualification, it is to be taken as determined by the cube in mercury method of melting point determination. As explained, the term "coumarone-indene resins" is to be taken as inclusive of resins composed of the polymers of either of those two substances, as well as resins composed of a mixture of polymers of the two. Where pressure is given without explanation, it is to be taken as meaning pounds per square inch. Where parts or proportions are given without express or implied qualification as to comparison of volumes, it is to be taken that parts by weight is intended.

Where a monomeric substance, or resin, is named as "indene" in description or illustration above, "coumarone" is to be understood as alternatively applicable, the two being interchangeable in the terms of the specification.

What is claimed is:

1. A method of hydrogenating coumarone-indene resin which comprises bringing such coumarone-indene resin into contact with hydrogen in the presence of copper chromite and in the presence of Raney nickel catalyst under such temperature and pressure conditions as chemically to saturate the non-aromatic double bond which characterizes the indene and coumarone resin structure and substantially to introduce hydrogen into the benzene rings of the said resin structure, the hydrogenation induced by the said catalysts being carried out at a temperature ranging from about 75° C. to 225° C. and under a pressure not substantially exceeding 2100 pounds per square inch.

2. A method of hydrogenating coumarone-indene resin which comprises bringing such coumarone-indene resin into contact with hydrogen in the presence of copper chromite and in the presence of Raney nickel catalyst under such temperature and pressure conditions as chemically to saturate the non-aromatic double bond which characterizes the indene and coumarone resin structure and substantially to introduce hydrogen into the benzene rings of the said resin structure, the hydrogenation induced by the said catalysts and carried out at a temperature ranging from about 75° C. to 225° C. being effected stepwise by controlling the temperature in such manner that it does not exceed 200° C. in the first stage thereof with the balance of the hydrogenation being carried out at a temperature of approximately 225° C., and the hydrogenation being effected under a pressure not substantially exceeding 2100 pounds per square inch.

3. A method of hydrogenating coumarone-indene resin which comprises bringing such coumarone-indene resin into contact with hydrogen in the presence of copper chromite and in the presence of Raney nickel catalyst at a temperature ranging from about 75° C. to 225° C. and under a pressure not exceeding 2100 pounds per square inch, thereby to chemically saturate the non-aromaic double bond which characterizes the indene and coumarone resin structure and substantially to introduce hydrogen into the benzene rings of the said resin structure, the said coumarone-indene resin being in dissolved form and each of the said catalysts constituting about 5% to 15% by weight of the resin.

4. A method of hydrogenating coumarone-indene resin which comprises bringing such coumarone-indene resin into contact with hydrogen in the presence of an oxide catalyst selected from the group of oxide catalysts consisting of copper chromite, iron chromite, nickel chromite, and black copper oxide, and in the presence of Raney nickel catalyst under such temperature and pressure conditions as chemically to saturate the non-aromatic double bond which characterizes the indene and coumarone resin structure and substantially to introduce hydrogen into the benzene rings of the said resin structure, the hydrogenation induced by the said catalysts being carried out at a temperature ranging from about 75° C. to 225° C. and under a pressure not substantially exceeding 2100 pounds per square inch.

5. A method of hydrogenating coumarone-indene resin which comprises bringing such coumarone-indene resin into contact with hydrogen in the presence of an oxide catalyst selected from the group consisting of copper chromite, iron chromite, nickel chromite, and black copper oxide, and in the presence of Raney nickel catalyst at a temperature ranging from about 75° C. to 225° C. and under a pressure not exceeding 2100 pounds per square inch, thereby to chemically saturate the non-aromatic double-bond which characterizes the indene and coumarone resin structure and substantially to introduce hydrogen into the benzene rings of the said resin structure, the hydrogenation induced by the said catalysts being effected stepwise by controlling the temperature in such manner that it does not exceed 200° C. in the first stage thereof with the balance of the hydrogenation being carried out at a temperature of approximately 225° C. and the hydrogenation being effected under a pressure not substantially exceeding 2100 pounds per square inch.

6. A method of hydrogenating coumarone-indene resin which comprises bringing such coumarone-indene resin into contact with hydrogen in the presence of an oxide catalyst selected from the group consisting of copper chromite, iron chromite, nickel chromite, and black copper oxide, and in the presence of Raney nickel catalyst at a temperature ranging from about 75° C. to 225° C. and under a pressure not exceeding 2100 pounds per square inch, thereby to chemically saturate the non-aromatic double bond which characterizes the indene and coumarone resin structure and substantially to introduce hydrogen into the benzene rings of the said resin structure, the said coumarone-indene resin being in dissolved form and catalyst of each of the said classes consisting about 5% to 15% by weight of the resin.

MARIE O. CARMODY,
*Administratrix of the Estate of William H. Carmody, Deceased.*

REFERENCES CITED

The following references are of record in the file of this patent:

UNITED STATES PATENTS

| Number | Name | Date |
|---|---|---|
| 2,128,984 | Carmody | Sept. 6, 1938 |
| 2,138,985 | Carmody | Sept. 6, 1938 |
| 2,139,722 | Carmody | Dec. 13, 1938 |
| 2,266,675 | Carmody | Dec. 16, 1941 |

FOREIGN PATENTS

| Number | Country | Date |
|---|---|---|
| 504,215 | German | Mar. 30, 1926 |

OTHER REFERENCES

Adkins et al.; J. Amer. Chem. Soc., vol. 53, pages 1091 to 1095 (1931). (Copy in Scie. Libr.)

Ellis; Hydrogenation of Organic Substances, 3rd ed., Van Nostrand, 1930 page 158. (Copy in Division 6.)

Durland et al.; J. Amer. Chem. Soc., vol. 60, pages 1501-5 (1938), as abstracted in Chem. Abstracts, vol. 32 (1938), page 5824. (Copy in Division 6.)

Tuda et al.; Berichte 72B, pages 716-23 (1938), as abstracted in Chem. Abstracts, vol. 33, pages 4969 (1939). (Copy in Division 6.)